UNITED STATES PATENT OFFICE.

SVEN EMIL SIEURIN, OF HÖGANÄS, SWEDEN.

PROCESS OF PRODUCING METALS.

1,065,890.    Specification of Letters Patent.    Patented June 24, 1913.

No Drawing.    Application filed May 6, 1910.    Serial No. 559,849.

*To all whom it may concern:*

Be it known that I, SVEN EMIL SIEURIN, subject of the King of Sweden, residing at Höganäs, Sweden, have invented new and useful Improvements in Processes of Producing Metals, of which the following is a specification.

This invention has for its object the reduction of metals from their ores by means of coal which may without injury contain impurities injurious to the metal, or coal rich in ashes, in solid form in such way that no impurities, derived from the reducing material, are contained in the metal produced.

In the production of iron and other metals it has heretofore been proposed to heat an intimate mixture of powdered ore and reducing agents without the access of air, or other gas from an external source, to such temperature that the metal is reduced without melting, and after the completion of the process and the cooling of the charge to separate the fine particles of the metal from the impurities with which they are mingled by magnetic or other physical separating means.

Now according to the present invention no use is made of an intimate mixture of the ore with the reducing agent, but the ore is embedded in a solid reducing agent either in the form of lumps or briquets or in the form of alternate layers, if the ore is in a powdered condition. At the end of the reducing process the cinders and impurities resulting from the reducing agent may be separated from the lumps of reduced metal without difficulty by physical means, because, as already mentioned, the ore and the reducing agent are not intimately mixed with one another. The metallic product obtained, consisting of lumps of reduced metal, agglomerated with the rock of the ore, is thus purer than that obtained by the reduction of an intimate mixture of pulverized ore and reducing agent and the method permits of the use of solid reducing agents of inferior quality, viz: those giving a large percentage of ashes.

In order to carry this invention into effect, ore, in the form of lumps or briquets, roasted or not roasted, is mixed with a solid reducing material, and charged into closed containers, whereby access of air is prevented, or if in a powdered state, is arranged in such containers in alternate layers with said reducing material, for instance in chambers with fire brick walls which are heated to such a temperature and for such a length of time that reduction takes place without the metal reduced being melted. Any method of heating may be used which is adapted for the purpose. After cooling, the charge is removed from the chambers and the products of reduction are separated from the remainder of the reducing material in some suitable way, for instance by dressing, screening, air separation or electrostatic separation. If the reducing material in question is contaminated with or contains sulfur, part of this sulfur would be transferred to the metal produced. This is prevented by mixing the reducing material with compounds of calcium, such as carbonate, hydrate, or oxid. The carbonate or the like will then absorb almost all the sulfur and is afterward removed together with the remainder of the reducing material by suitable means. As is well known, lime or limestone is much used as a sulfur-absorbing agent in metallurgical processes, but in all hitherto known processes the lime, containing the absorbed sulfur has been separated from the metal produced with the slag upon the melting of the metal, with the result that part of the sulfur enters the metal. By the present process a metal is obtained which is practically free from sulfur. For instance, in the case of using reducing materials containing as much as one per cent. sulfur or more, it has been found that the sulfur in the metal recovered amounted to no more than .005 per cent. The same result is accomplished by placing the lime or limestone between the ore and the reducing material or by a combination of both methods.

A suitable temperature for reducing iron ore is 1000° C. to 1300° C. and the shortest time of heating with the usual dimensions of apparatus used in practice with a good result has proved to be about four days. The proportions of carbon and ore used are greatly variable and depend upon the quality of the two materials as also on the temperature. In the reduction of very rich ore (70 per cent. Fe), however, a very good result has been obtained with 0.5 kg. of low grade carbon (giving 40 per cent. ashes) per 1 kg. ore. With the present process of recovering metals it has proved very advantageous to expose the ore and the reducing means to the influence of heat during a comparatively long time. In this way the reduction becomes more complete, the product more uniform and the remainder of the reducing material more easily removable from the reduction product after the completion of the process, as compared with the conditions prevailing when only a short time is allowed for the action of heat. Another advantage obtained in this way is that the metallic product will sinter together forming a denser product, more capable of resisting oxidation than otherwise would be the case. When carried out in this way the process will also be more economical as a lower temperature and larger charging chambers may be used than when the charge is exposed to heat for a shorter time. This increase in time consumed in the present process compared with the time used according to older methods is very considerable. In the blast furnace process a time not exceeding 15 hours is usually used, whereas in the process in question several days may be required for the operation.

Coal, so rich in ashes as to be of no use in other processes may still be very suitable for use as a reducing agent in the present process, as the ashes do not combine with the metal. Hitherto it has been impossible with advantage to use coal containing a large percentage of ashes for the reduction of iron ore. Therefore this method offers great economical advantages, as coal rich in ashes is very cheap and so far has been in little demand.

It may be observed that the product obtained does not consist of pure metal, but pieces or lumps of reduced metal, agglomerated with the rock of the ore, but free from the residue and ash of the reducing material. The resulting product moreover may be subjected to further treatment for instance in Martin furnaces.

Having now particularly described and ascertained the nature of my said invention, and in what manner the same is to be performed, I declare that what I claim is:—

1. In the reduction of iron ore, the process which comprises assembling masses of such ore spaced by bodies of fuel, the size of such masses being such that the greater proportion of the material of such masses is out of contact with said fuel, and heating such assemblage under exclusion of air to a temperature insufficient to produce fusion but sufficient to produce a reduction of such ore to the metallic state.

2. The method of producing a body of iron free from fuel contaminations which comprises assembling a substantial body of iron ore with one or more faces in proximity to a body of fuel but with the greater proportion of the ore in such ore body out of direct contact with said fuel, heating the assemblage by externally derived heat to a temperature below the melting point of iron until the ore is reduced, and then removing from the main metal body so produced the exterior faces contaminated by contact with solid materials from the body of fuel.

3. The method of reducing iron ore with low-grade sulfur-containing fuel without contamination of the produced iron by sulfur and other fuel impurities which comprises admixing such fuel with sulfur-retaining bases, assembling a body of such admixture in proximity to one or more faces of a substantial body of ore, the greater proportion of the material in such admixture and of the ore in such ore body being out of direct contact, and heating the assemblage by externally derived heat to a temperature below the melting point of iron until the ore is reduced.

In testimony whereof I have signed my name to this specification in the presence of two subscribing witnesses.

SVEN EMIL SIEURIN.

Witnesses:
P. A. LINDAHL,
GERMUND E. ANDERSON.